Sept. 12, 1967   H. H. WORMSER   3,340,760

MEANS FOR PREVENTING AXIAL MOVEMENT OF A SHAFT OR STUD

Filed May 5, 1965

INVENTOR.
HANS H. WORMSER

BY Leonard H. King

ATTORNEY.

United States Patent Office 3,340,760
Patented Sept. 12, 1967

3,340,760
MEANS FOR PREVENTING AXIAL MOVEMENT OF A SHAFT OR STUD
Hans H. Wormser, New Milford, N.J., assignor to Markite Corporation, New York, N.Y.
Filed May 5, 1965, Ser. No. 453,347
2 Claims. (Cl. 85—8.8)

This invention relates to improved means for preventing axial movement of a shaft-like member.

One of the more common types of shaft or stud retaining means in general usage today is exemplified by the principles of the Waldes-Kohinoor "Truarc" ring. Basically, the prior art devices comprise a single planar member, usually a metallic disc provided with a keyhole type aperture, that is intended to be snapped into an annular groove in a shaft to prevent its axial movement. The circular portion of the keyhole aperture is usually a little smaller but may be the same size or slightly larger than the diameter of the annular shaft groove while the non-circular portion of the keyhole aperture which is defined by two spaced jaws is somewhat smaller than the shaft groove.

In practice, retaining rings used to prevent axial movement of a shaft or stud are deployed on either side of a fixed member or, alternatively, on only one side and different retaining means such as an integral hub are used on the other side. In prior art retaining rings, the relative motion of the jaws of the retainer to open and the physical stress which causes them to close again are achieved in the same substantially planar part of the device. Consequently, particularly in the small sizes, they must be stressed nearly up to and sometimes beyond their elastic limit. When this happens the ring is loose on the part it is supposed to restrain. Stated another way, the planar rings of the prior art are stressed in their least flexible plane. A member which has been overstressed does not necessarily lose its resilience but acquires a new static shape.

Many variations of the aforementioned retaining means are presently available. Some of them in fact are non-planar and bear a superficial resemblance to the instant device. However, to the best of applicant's knowledge, no prior art shaft retaining device operates on the same principles as the present invention nor do they provide the improved features to be described hereinafter.

The present invention is substantially L-shaped and in contrast to the prior art, both legs are active in the retention of the shaft. A keyhole aperture formed in one leg defines a pair of jaws. A slot extends from the main portion of the aperture into the other leg. When the jaws defined by the aperture in the first leg are opened, the metal in the other leg becomes stressed like a beam in its most flexible plane. The extent of opening the jaws without overstressing and the assured clamping ability of the device are thereby greatly increased.

Several embodiments of the present invention which are within the scope of the basic concept will be described. One embodiment provides that the stressed leg acts like a simple beam while another embodiment induces a compound bending and twisting action in a somewhat longer leg approximately perpendicular to that containing the shaft aperture. Still another embodiment provides a slight curvature to the apertured leg in order to elastically take up variations in the axial position of the annular shaft groove. While the retainer of this invention will be described herein as having a circular aperture to conform to a circular shaft, which is indeed its commonest application, it will be readily appreciated that this aperture can be made in various other shapes to conform to non-circular members, without departing from the spirit of the invention.

As will be evident from the ensuing description, the present invention overcomes serious shortcomings of the prior art devices. Heretofore, particularly in small sized retaining rings the necessity to achieve movement of the jaws of the ring and to avoid the stressing of the ring beyond its elastic limit places severe design restrictions on the dimensions of the ring and of the groove in which the ring sets. For smaller rings, say those used on a ⅛″ diameter shaft, the groove may only be a few thousandths of an inch deep. Therefore, the axial force which can be resisted by the retained part is very limited. With the more pliable ring of the present invention, the groove can be much deeper and therefore the ability to resist an axial force will be increased.

Accordingly, it is an object of the present invention to provide improved means for axially restraining a shaft.

It is another objective to provide a resilient shaft retainer having a stressable portion in a plane other than that used to retain the shaft.

A further object is to provide a substantially L-shaped shaft retainer wherein one leg is stressed in the manner of a beam when the other leg is disposed about the shaft.

An additional object is to provide shaft retaining means of the aforementioned type that is used with an annularly grooved shaft.

Still another object is to provide integral means for taking up axial play of the shaft being retained.

A further object is to provide shaft retaining means that permits the use of a relatively deep annular groove on a small diameter shaft.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

Figure 1:
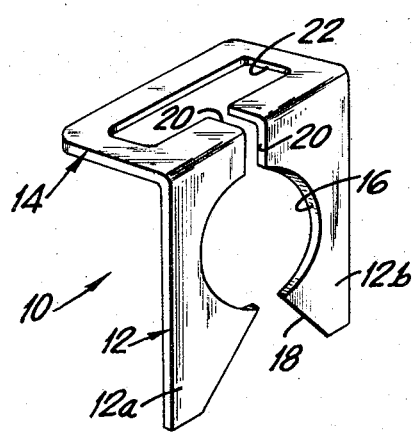
FIG. 1 is an enlarged pictorial view of one embodiment of the present invention.
Figure 2:
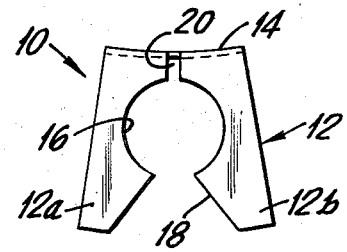
FIG. 2 is a front elevation of the FIG. 1 embodiment in the stressed condition illustrating the bending plane of the present invention.
Figure 3:
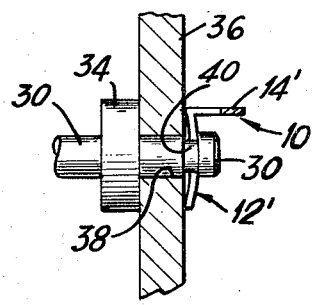
FIG. 3 is a sectional side elevation illustrating the present invention in use as well as an optional feature that may be incorporated.

Referring now to the drawing and in particular to FIGS. 1–3, the first embodiment of the improved shaft retaining means is generally designated by the reference character 10. The retainer, comprised of legs 12 and 14 disposed in two different planes substantially at right angles to each other is made from a sheet of spring material such as spring steel, tempered stainless steel, beryllium copper, Phosphor bronze etc. The thickness of the retainer is variable and is a function of the material used and the dimensions of the parts to be retained as well as the shaft groove. Leg 12 is provided with an aperture 16 from which extends a lower slot 18 and an upper slot 20. The opposed walls of lower slot 18 may conveniently be at some angle to each other to facilitate passing the retainer into the shaft while the opposed walls of upper slot 20 can be substantially parallel to each other. It will be seen in FIG. 1 that upper slot 20 extends into leg 14 and terminates at an enlarged aperture 22.

To assemble the retainer on a shaft, jaws 12a and 12b of leg 12 are spread apart as shown in FIG. 2. The effect of this action is to bow leg 14 inwardly in the manner of a beam being stressed. Slot 20, extending into leg 14 permits the transfer of the bending forces into another plane than that on which the clamping action takes place. Thus a simple retaining member is provided having greater resilience than either the single plane retainers or the two-plane retainers in the prior art.

While the foregoing embodiment has been described as having slot 20 in the plane of both legs, there is another slightly different configuration within the general scope of the present invention. Slot 20 may be terminated at the juncture of legs 12 and 14 and aperture 22 shaped so that it meets the slot at the juncture of the legs. When jaws 12a and 12b are then separated, leg 14 will be stressed and will assume the concave shape shown in FIG. 2. It should be noted that prior art retaining rings that do not have a slot comparable to slot 20 would have a tendency to stretch, and under certain circumstances tear at the midpoint of the two jaws. The present invention utilizing the construction of any of the described embodiments avoids the weakness. The leg integral with the gripping leg is always stressed in the manner of a thin beam and since the gripping leg is defined by a pair of separable jaws, no stretching or tearing will occur.

FIG. 3 illustrates the second embodiment of the present invention in the assembled condition and includes an optional feature. Leg 12′, formed as before at substantially right angles to leg 14′, may be made slightly bowed or concave in order to take up axial play of the retained member. By way of example stud 30, is provided with an enlarged portion 34 adapted to firmly abut one side of wall 36. The stud is passed through aperture 38 in the wall so that stud groove 40 is disposed on the other side. Retaining member 10′ is then snapped into groove 40 and minor dimensional variations in the size and/or the axial placement of the groove will be compensated for by the inherent resilience of bowed leg 12′. In all other respects, particularly the principle of operation, the second embodiment is the same as the first embodiment. For the purpose of this description, primed reference characters denote portions of the structure similar to unprimed structure in the previous embodiment.

It should be pointed out at this time that in the embodiments already described, the dimension of aperture 16 normally provides a relatively tight fit above groove 40 in stud 30. The width of slot 18 at its lower most end is slightly larger than the shaft groove dimension and the width of slot 18 at its juncture with aperture 16 is a dimension which will permit the separation of jaws 12a and 12b to the shaft groove diameter without exceeding the elastic limit of the metal. The aforementioned proportions assure the springing back of jaws 12a and 12b in order to hold the shaft tightly.

Figure 4:
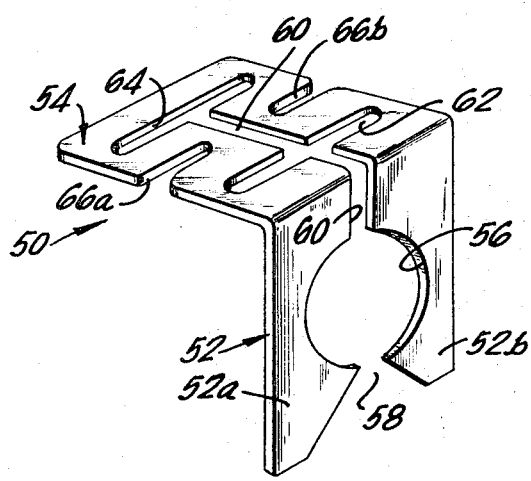
FIG. 4 is an enlarged pictorial view of an alternative embodiment of the present invention.

In FIG. 4, there is shown still another embodiment of the present invention wherein increased resilience is provided. Retainer member 50 is once again provided with two legs 52 and 54 in two different planes and approximately at right angles to each other. Leg 52 is provided with aperture 56 and opposed slots 58 and 60 on either side of the aperture. As in the previous embodiments, slot 58 has angular, opposed walls which define jaw portions 52a and 52b. By spreading apart the jaws of leg 52, the retainer may be pressed into groove in the shaft on which a part is to be retained. Slot 60 extends into leg 54 and bisects a first aperture 62 before terminating in a second aperture 64. Intermediate the first and second apertures, leg 54 is provided with a pair of slots 66a and 66b which extend inwardly of the edges of the leg.

Figure 5:
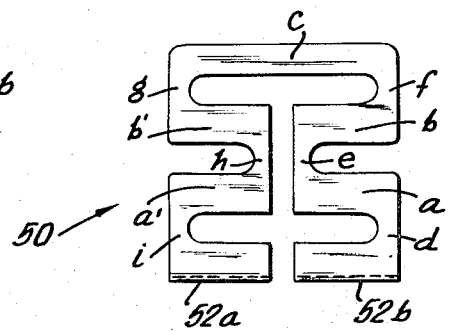
FIG. 5 is a plan view of the FIG. 4 embodiment.

The embodiment of FIG. 4 is one of many possible variations which provide increased resilience in the retaining member by increasing the effective beam length while still maintaining the ease of application. When jaw portions 52a and 52b are spread apart the following bending moments will be set up in leg 54. As may best be seen in FIG. 5 sections a, a′, b, b′, and c, are stressed like beams while sections d, e, f, g, h, and i, will have some torsional stress imparted thereto. This construction effectively increases the length of the member which is stressed like a beam and also increases the total permissible deflection.

The devices disclosed hereinabove and illustrated in the drawing all provide greater resilience for the same holding power than preexisting small shaft retainers. In each of the embodiments the stress resulting from the separating of the shaft gripping jaws is effectively transferred to another member of the device which then reacts as a stressed beam. In one embodiment the leg is modified to increase the effective beam length thus providing increased resilience in the shaft gripping leg. It is unlikely then that the device will be stressed beyond its elastic limit during normal usage and in addition, the present invention can withstand greater abuse than other retainers presently available. A feature of one embodiment is the provision of means to compensate for variations in the position of the shaft's groove by virtue of the inherent resiliency in the cuplike shape of the shaft retaining leg. It should be understood that various combinations of two or more of the several embodiments may be made within the scope of the present invention.

It should also be noted that the elongated apertures shown to be transversely positioned in beam stressed leg may take other shapes such as a triangle and that the improved retainer will work equally well on round studs having an annular groove and other shaped studs having a different shaped groove. In addition the shaft retaining aperture need not necessarily be centrally located but may be offset to either side of the slot if this is found to be advantageous for a particular application.

There has been disclosed heretofore the best embodiments of the invention presently contemplated and it is to be understood that various changes and modifications may be made by those skilled in the art without departing from the spirit of the invention.

I claim:
1. Improved means to prevent relative axial movement between a shaft having a transverse peripheral groove and a member to be axially restrained with respect to the shaft, said means comprising:
   (a) a first leg having a shaft-gripping aperture therein and a first slot extending from the aperture and terminating at the end of said first leg;
   (b) a second leg integral with and formed in a plane other than that of said first leg, said second leg having at least two parallel apertures therein;
   (c) said first leg having a second slot extending from the shaft-gripping aperture into said second leg, the second slot being positioned such that it bisects one of the apertures in said second leg and terminates in the other aperture in said second leg;
   (d) said second leg including at least one pair of opposed slots extending inwardly from the side edges thereof, the opposed slots being substantially parallel to and intermediate the apertures in said second leg, the opposed slots being substantially perpendicular to the slot in said first and second legs;
   (e) said first leg defining a pair of resilient, opposed shaft-gripping jaws whereby said second leg is adapted to be stressed as a beam when the jaws of said first leg are separated.

2. Improved sheet metal means to prevent relative axial movement between a shaft having a transverse peripheral groove and a member to be axially restrained with respect to the shaft, said means comprising:
   (a) a first leg defined generally by a planar surface having a shaft-gripping aperture therein and a first slot extending from the aperture and terminating at the end of said first leg;
   (b) a second leg defined by a planar surface, said second leg being integral with and formed in a plane other than that of said first leg, said second leg having an aperture therein;
   (c) said first leg having a second slot narrower than the aperture in said first and second legs and extending from the aperture in said first leg in a direction other than the first slot, the second slot in said first leg extending into said second leg and terminating at the aperture therein, whereby said first leg defines a pair of resilient opposed shaft-gripping jaws that are at least partially disposed in the peripheral groove in the asembled condition and whereby said second leg is adapted to be stressed as a beam when the jaws of said first leg are separated; and wherein said second leg is provided with at least one additional aperture disposed substantially parallel to the first aperture therein whereby the contiguous slot in said first and second leg bisects said additional aperture before terminating in the first aperture in said second leg.

References Cited
UNITED STATES PATENTS

| | | | |
|---|---|---|---|
| 1,335,944 | 4/1920 | Farnsworth | 85—8.8 |
| 1,907,506 | 5/1933 | Coburn | 85—8.8 |
| 1,968,557 | 7/1934 | Johanson | 85—8.8 |
| 2,078,453 | 4/1937 | Miller | 85—8.8 |
| 2,353,933 | 7/1944 | Schneider | 85—8.8 |
| 2,896,287 | 7/1959 | Stultz | 24—211 |
| 2,933,970 | 4/1960 | Pagano | 85—8.8 |
| 3,297,916 | 1/1967 | Wright | 317—100 |

CARL W. TOMLIN, *Primary Examiner.*

G. A. MILWICK, R. S. BRITTS, *Assistant Examiners.*